(12) United States Patent
Erlacher et al.

(10) Patent No.: US 11,851,016 B2
(45) Date of Patent: Dec. 26, 2023

(54) PASSENGER TRANSPORT VEHICLE

(71) Applicant: MAGNA STEYR Fahrzeugtechnik AG & Co KG, Graz (AT)

(72) Inventors: Manuel Erlacher, Radenthein (AT); Maximilian Langer, Graz (AT); Harald Zachnegger, Graz (AT)

(73) Assignee: MAGNA STEYR Fahrzeugtechnik GMBH & Co KG, Graz (AT)

( * ) Notice: Subject to any disclaimer, the term of this patent is extended or adjusted under 35 U.S.C. 154(b) by 340 days.

(21) Appl. No.: 17/341,025

(22) Filed: Jun. 7, 2021

(65) Prior Publication Data

US 2021/0291912 A1    Sep. 23, 2021

Related U.S. Application Data

(62) Division of application No. 16/253,986, filed on Jan. 22, 2019, now abandoned.

(30) Foreign Application Priority Data

Jul. 16, 2018 (EP) .................................. 18183670
Dec. 6, 2018 (EP) .................................. 18210747

(51) Int. Cl.
*B60R 21/00* (2006.01)
*B60R 21/02* (2006.01)
(Continued)

(52) U.S. Cl.
CPC .............. *B60R 21/026* (2013.01); *B60N 2/01* (2013.01); *B62D 31/025* (2013.01); *B62D 47/02* (2013.01); *A61G 3/0808* (2013.01)

(58) Field of Classification Search
CPC .... B62D 21/026; B62D 47/02; A61G 3/0808; B60P 7/14
(Continued)

(56) References Cited

U.S. PATENT DOCUMENTS 1,048,131 A    12/1912 Brackett
1,798,011 A    3/1931 Antonio
(Continued)

FOREIGN PATENT DOCUMENTS

CN    201371867 Y    12/2009
CN    107757729 A    3/2018
(Continued)

OTHER PUBLICATIONS

Chinese Office Action for CN Patent Application No. 201910187681.X (dated Aug. 18, 2021).

*Primary Examiner* — Stephen T Gordon
(74) *Attorney, Agent, or Firm* — Todd A. Vaughn; Jordan IP Law, LLC

(57) ABSTRACT

A passenger transport vehicle includes a vehicle body having at least one left passenger compartment arranged in a travel direction on a left side of the vehicle, and at least one right passenger compartment arranged in a travel direction on a right side of the vehicle. Each passenger compartment has at least one passenger space and an access door to permit ingress into and egress from the at least one passenger space. A partition wall is arranged between the at least one left passenger compartment and the at least one right passenger compartment to restrict entry of passengers between the left passenger compartment and the right passenger compartment.

16 Claims, 22 Drawing Sheets

(51) Int. Cl.
*B60N 2/01* (2006.01)
*B62D 31/02* (2006.01)
*B62D 47/02* (2006.01)
*A61G 3/08* (2006.01)

(58) Field of Classification Search
USPC .. 296/24.4, 24.41, 24.42, 24.45, 24.46, 178, 296/190.1, 190.11, 64
See application file for complete search history.

(56) References Cited

U.S. PATENT DOCUMENTS

| | | | |
|---|---|---|---|
| 2,124,003 | A | 7/1938 | McDonnell, Jr. et al. |
| 2,134,032 | A | 10/1938 | Crawford et al. |
| 3,362,746 | A | 1/1968 | Huyge |
| 4,159,141 | A | 6/1979 | Dirck |
| 4,621,856 | A | 11/1986 | McKenzie |
| 5,238,282 | A | 8/1993 | Watson et al. |
| 6,286,882 | B1 | 9/2001 | Rastetter |
| 6,543,827 | B2 | 4/2003 | Miller |
| 6,964,219 | B2 * | 11/2005 | Gilon .............. F42D 5/045 296/24.46 |
| 10,752,196 | B2 | 8/2020 | Lalague |
| 2013/0020824 | A1 * | 1/2013 | Tinterow .......... B60R 21/026 29/428 |
| 2016/0001729 | A1 * | 1/2016 | Mochizuki .......... B60R 21/12 296/24.46 |
| 2018/0050740 | A1 | 2/2018 | Guessen et al. |

FOREIGN PATENT DOCUMENTS

| | | |
|---|---|---|
| EP | 2065252 A2 | 6/2009 |
| JP | 05246355 A | 9/1993 |
| JP | H05246355 A | 9/1993 |
| JP | H0627460 U | 4/1994 |
| JP | 3175966 U | 6/2012 |
| WO | 2011107289 A1 | 9/2011 |

* cited by examiner

PASSENGER TRANSPORT VEHICLE

CROSS-REFERENCE TO RELATED APPLICATIONS

The present application is a divisional of U.S. patent application Ser. No. 16/253,986 (filed Jan. 22, 2019), which claims priority under 35 U.S.C. § 119 to European Patent Publication Nos. EP 18183670.1 (filed on Jul. 16, 2018) and EP18210747.4 (filed on Dec. 6, 2018), which are each hereby incorporated by reference in their complete, respective entireties.

TECHNICAL FIELD

Embodiments relates to a passenger transport vehicle.

BACKGROUND

Passenger transport vehicles, such as, for example, buses, are known per se. They generally have an arrangement of seats for passengers which group the passengers in relatively small or large groups. For example, the seats may comprise double seats which are located one behind the other or in the form of four or six seats facing each other. Generally, along the longitudinal axis of a passenger transport vehicle, in the centre of the vehicle a central aisle from which the individual seats and seat groups may be reached is formed.

SUMMARY

Embodiments relate to a passenger transport vehicle which enables enhanced privacy for the passengers transported in the passenger transport vehicle.

In accordance with embodiments, a passenger transport vehicle may comprise: at least one left passenger compartment having at least one passenger space which is arranged in the travel direction on the left side of the vehicle, and at least one right passenger compartment having at least one passenger space which is arranged in the travel direction on the right side of the vehicle; a partition wall between the left passenger compartment and the right passenger compartment which extends in the longitudinal direction of the vehicle so that, at least in a normal operating state of the partition wall, entry is not possible from the left passenger compartment into the right passenger compartment and vice versa; a first access door, at the left passenger compartment, to the outer side of the passenger transport vehicle on the left side of the passenger transport vehicle; and a second access door, at the right passenger compartment, to the outer side of the passenger transport vehicle on the right side of the passenger transport vehicle.

In accordance with embodiments, a passenger transport vehicle has passenger compartments which each have at least one passenger space, in particular, a seat for a passenger, and which are separated from each other via a partition wall. The partition wall is constructed to prevent access to a passenger compartment, for example, the right passenger compartment, via another passenger compartment, for example, the left passenger compartment. Each passenger compartment, therefore, has its own outer access door, via which entry into and exit from the individual passenger compartment is facilitated. For passengers in a passenger compartment, the separation via partition walls and autonomous entry/exit possibilities results in enhanced travel comfort, and in particular, enhanced privacy. If several passengers are located inside a passenger compartment, communication between these passengers in a passenger compartment is facilitated. Visibility and overhearing the communication of passengers from other passenger compartments may be reduced by the separated passenger compartments.

As a result of the partition wall(s), at least in a normal operating state of the respective partition wall, entry from the left passenger compartment into the right passenger compartment and vice versa is not possible. The partition walls may not have access doors.

In accordance with embodiments, the passenger transport vehicle may have no central aisle. Instead, the partition wall extends between the left passenger compartment and right passenger compartment, for example, along the longitudinal centre axis of the passenger transport vehicle.

In accordance with embodiments, each passenger compartment may have precisely one seat. Alternatively, all or some of the passenger compartments may have precisely two seats. In this case, a seat may be provided for precisely one passenger or for two passengers.

In accordance with embodiments, the passenger transport vehicle preferably has at least two left passenger compartments and/or at least two right passenger compartments, wherein each passenger compartment has its own access door to the outer side of the passenger transport vehicle, wherein between the left passenger compartments and/or between the right passenger compartments a partition wall extends in the transverse direction of the vehicle, so that, at least in a normal operating state of the passenger transport vehicle, entry from one left passenger compartment into the other left passenger compartment and/or from one right passenger compartment into the other right passenger compartment is not possible.

In accordance with embodiments, the passenger transport vehicle may have a plurality of passenger compartments, such as for example, two passenger compartments, four passenger compartments, six passenger compartments, eight passenger compartments, or ten passenger compartments.

In accordance with embodiments, at least six passenger compartments may have their own access door, i.e., an outer door to facilitate entry into and exit from the passenger compartment.

In accordance with embodiments, partition walls may be arranged both in the longitudinal vehicle direction and in the transverse vehicle direction.

In accordance with embodiments, there may be precisely two passenger compartments, one beside the other in the transverse vehicle direction.

In accordance with embodiments, the partition walls, both in the longitudinal vehicle direction and where applicable in the transverse vehicle direction, may be opaque in the normal operating state, and/or substantially soundproof, and/or extend substantially over the entire vertical face in the inner space, i.e., extend from a floor of the passenger transport vehicle as far as a ceiling of the passenger transport vehicle. The partition walls may stand vertically in the vehicle.

In accordance with embodiments, the position of at least one partition wall which is orientated in the transverse direction of the vehicle may be displaceable in the longitudinal direction of the vehicle and/or the position of at least one partition wall which is orientated in the longitudinal direction of the vehicle may be displaced in the transverse direction of the vehicle. As a result of the displacement of the partition walls, the size of the individual compartments may be modified in accordance with requirements.

In accordance with embodiments, when a partition wall is displaced, at least one passenger compartment becomes larger in size, but at least one other passenger compartment becomes smaller in size.

In accordance with embodiments, the seat or seats may be displaceable in a passenger compartment. The displaceability of the seats is in this instance greater than the general displaceability of seats in the context of a conventional seat adjustment. Particularly, when the partition walls are displaceable, the seats may thereby be adapted in terms of their respective position to a changed size or geometry of the passenger compartment.

In accordance with embodiments, at least one partition wall may be moved by a passenger at least partially between a normal operating position into a half-open position. The half-open position, in this instance, is a state of the partition wall in which the partition wall is at least partially still present so that the access from one passenger compartment into another passenger compartment (separated by the half-open partition wall) is at least made more difficult or is further not possible. In the half-open position, at least a portion of the partition wall is open so that there is, in particular, visual contact and enhanced acoustic contact between the passenger compartments. The term "half-open" is, in accordance with embodiments, not limited to an opening halfway, that is to say, by 50%, but instead reflects that a portion of the partition wall remains, whilst another portion of the partition wall is open. For example, a retractable, upper portion of the partition wall may be retracted into a fixed, lower portion of the partition wall.

In accordance with embodiments, alternatively or additionally, at least one partition wall may be able to be switched by a passenger at least partially into a transparent state.

In accordance with embodiments, the half-opening and/or the transparent switching of a partition wall may be carried out by a control circuit. The control circuit may be configured in such a manner that a request for half-opening and/or transparent switching of a partition wall is possible from each of the two passenger compartments separated by the partition wall. The control circuit may be configured in such a manner that the half-opening and/or transparent switching of a partition wall is carried out only when a request or confirmation of the half-opening and/or transparent switching of the partition wall has been carried out from both passenger compartments which are separated by the partition wall.

In accordance with embodiments, the passenger transport vehicle comprises at least one additional passenger compartment which also has its own access door to the outer side of the passenger transport vehicle, in the same manner as the other passenger compartments, and which is constructed as a luggage compartment or as a wheelchair user compartment or as a driver's cab or as a multi-person compartment. For example, a passenger compartment may comprise a seat which in a folded-up state provides space for receiving a wheelchair user.

In accordance with embodiments, a luggage compartment may be arranged directly beside a driver's seat in a common passenger compartment so that the driver can observe or check the removal. Such a luggage compartment may additionally or alternatively be monitored via a camera so that, for example, each passenger may visually watch on a screen in his/her passenger compartment when objects are removed by other persons.

In accordance with embodiments, the access doors may, for example, be constructed as individual doors, foldable doors, sliding doors, or single-action doors.

DRAWINGS

Embodiments will be illustrated by way of example in the drawings and explained in the description below.

FIGS. 1 to 4 respectively illustrate a sectional schematic view of a passenger transport vehicle, in accordance with embodiments.

FIGS. 5 to 6 respectively illustrate a sectional schematic view of a passenger transport vehicle, in accordance with embodiments.

FIGS. 7 to 12 respectively illustrate a sectional schematic view of a passenger transport vehicle, in accordance with embodiments.

FIGS. 13 to 20 respectively illustrate a sectional schematic view of different operating states of a partition wall between passenger compartments of a passenger transport vehicle, in accordance with embodiments.

DESCRIPTION

Figure 1:
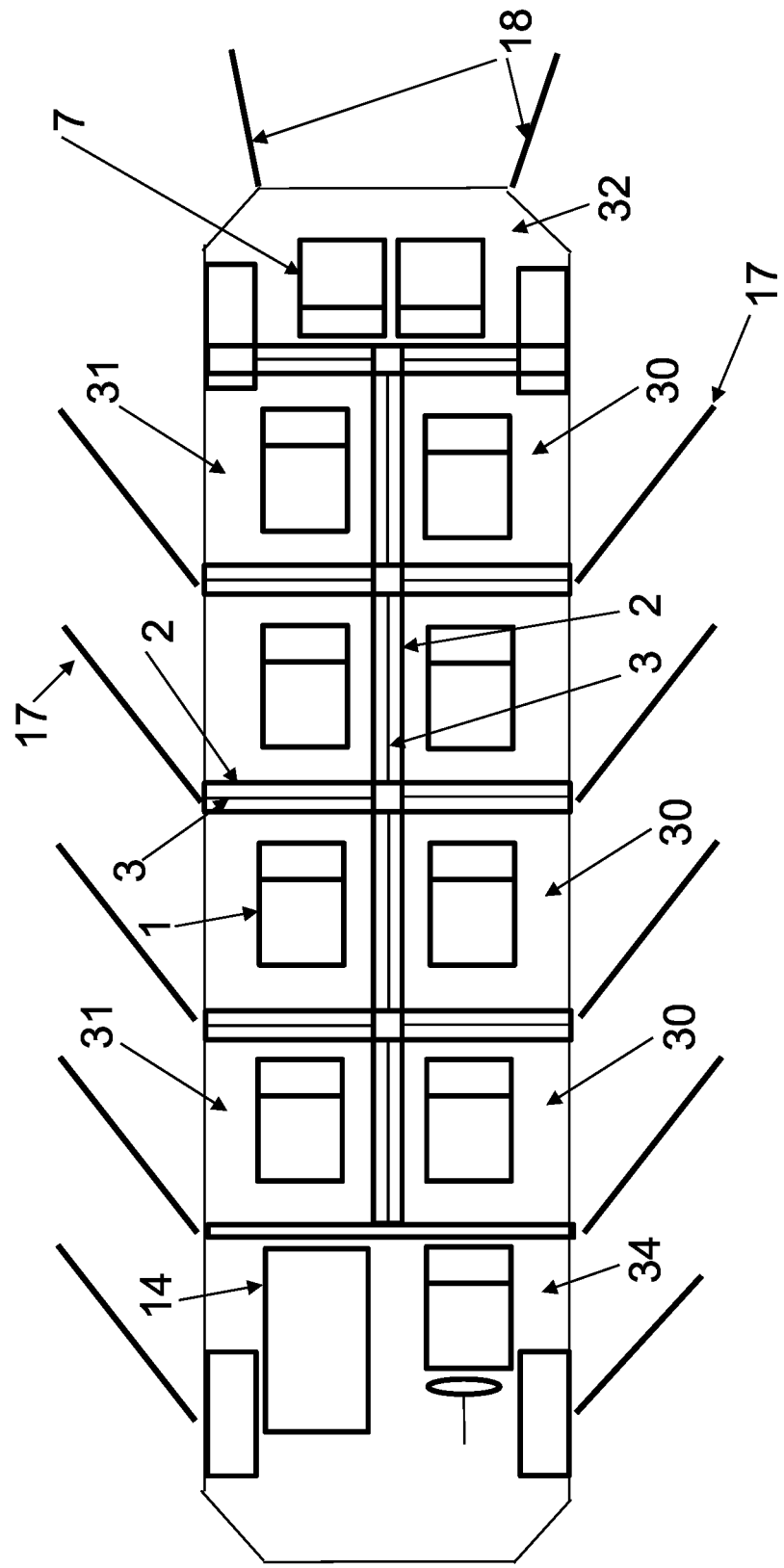

FIG. 1 illustrates a passenger transport vehicle such as, for example, a bus, in accordance with embodiments. Such a passenger transport vehicle may be configured, for example, to be occupied by a total of ten passengers and one driver. The passenger transport vehicle comprises a vehicle body having four left passenger compartments 30 and four right passenger compartments 31. Each passenger compartment 30, 31 is to have one passenger space, i.e., in each case a seat 1, which are arranged in the travel direction on the left side (and right side) of the vehicle. Meaning, each left or right passenger compartment 30, 31 has precisely one seat 1.

In accordance with embodiments, a longitudinal partition wall 2, 3 is arranged to extend in the longitudinal direction of the vehicle between each left passenger compartment 30 and an adjacent right passenger compartment 31 so that, at least in a normal operating state of the partition wall 2, 3, entry from the left passenger compartment 30 into the right passenger compartment 31 (and vice versa) is restricted.

In accordance with embodiments, a transverse partition wall 2, 3 is arranged in each case between the left passenger compartments 30 and between the right passenger compartments 31 so as to extend in the transverse direction of the vehicle so that, at least in a normal operating state of the partition wall 2, 3, entry from a left passenger compartment 30 into another left passenger compartment 30 and from a right passenger compartment 31 into another right passenger compartment 31 is restricted.

In accordance with embodiments, each left passenger compartment 30 has an access door in the form of a swing door 17 to the outer side of the passenger transport vehicle on the left side of the passenger transport vehicle. Each right passenger compartment 31 has an additional access door in the form of a swing door 17 to the outer side of the passenger transport vehicle on the right of the passenger transport vehicle. Accordingly, each passenger compartment 30, 31 has its own access door.

In accordance with embodiments, the passenger transport vehicle has no central aisle. Instead, in the longitudinal centre axis of the vehicle there is arranged a continuous partition wall 2, 3 to extend in the longitudinal direction of the vehicle which separates the left passenger compartments 30 from the right passenger compartments 31.

In accordance with embodiments, at the rearmost region of the passenger transport vehicle, a multi-person compartment 32 comprising two foldable passenger seats 7 is provided. The multi-person compartment 32 has a double door 18 with leaves which at the rear of the vehicle may be opened to the left or to the right.

In accordance with embodiments, at the front region of the passenger transport vehicle, a driver's cab 34 is provided having two access doors in the form of swing doors 17. The driver's cab 34 also forms a luggage compartment 14 since there is a space available inside for items of luggage.

In the seat arrangement shown, consequently, 8 out of the 10 seats 1 are accessible to the left side and the right side of the passenger transport vehicle via a separate swing door or single-action door 17. Two foldable seats 7 are accessible via a double door 18 at the rear region of the vehicle. This seat arrangement, therefore, has individual doors 17 and the partition walls 2, 3 between the seats 1, whereby a separate compartment is produced for each passenger. This provides the best possible privacy for the passengers.

Possible embodiments of the partition walls 2, 3 are illustrated in greater detail in FIGS. 13 to 20.

Figure 2:
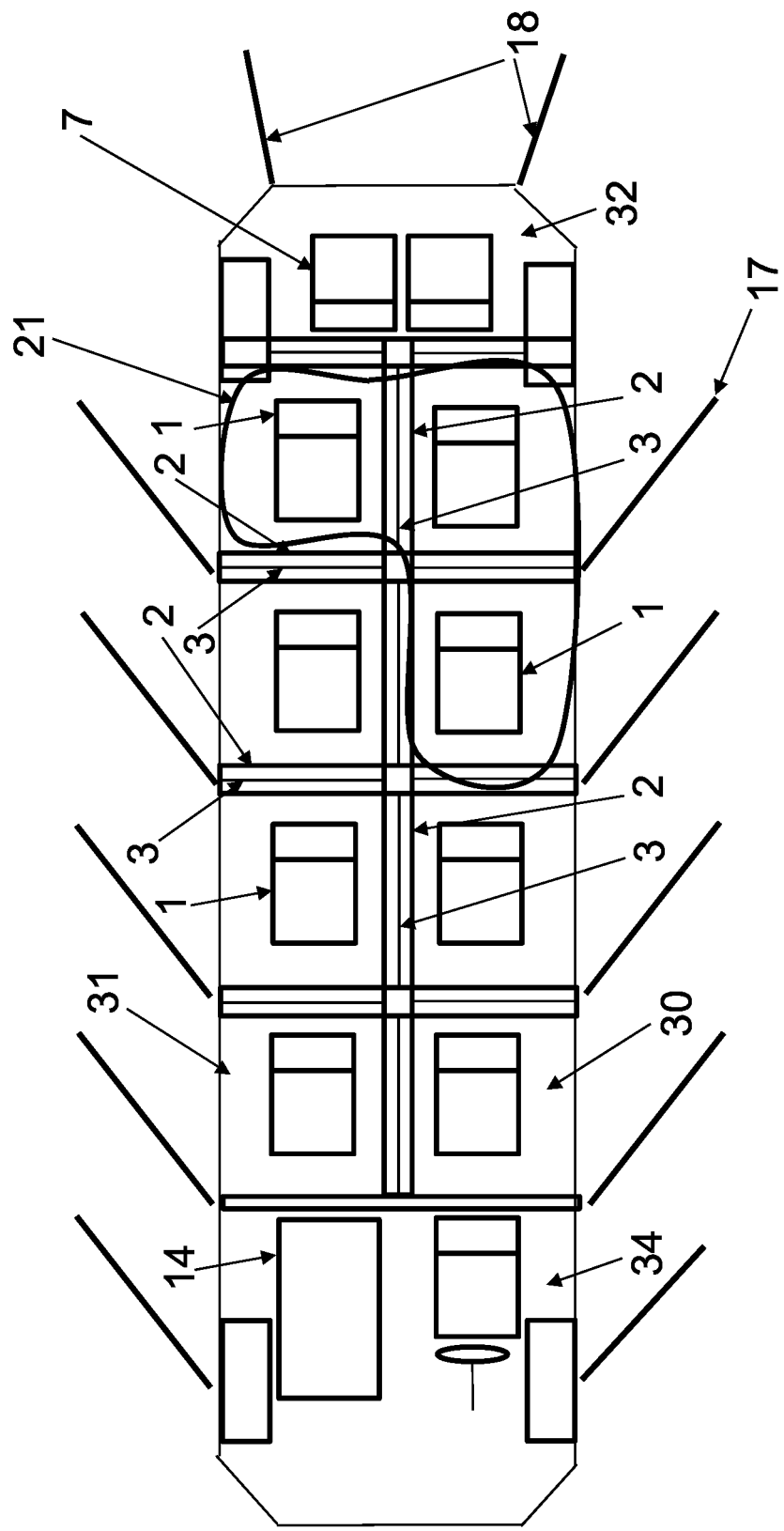

FIG. 2 schematically illustrates, as a result of individually/selectively retractable partition walls 3 which may each be retracted into fixed partition wall portions 2 and which are used longitudinally and transversely in the vehicle, a common space 21 may be provided temporarily (circled in FIG. 2) which allows passengers from different passenger compartments 30, 31 to interact/communicate with each other. To this end, the retractable portions of the partition walls 3 are retracted between the relevant passenger compartments 30, 31.

In accordance with embodiments, for example, a booking operation for a passenger transport vehicle could be carried out as follows if several passengers wish to travel together. A passenger books a seat 1 for three persons. These three persons may automatically be allocated 3 seats 1 which are located adjacent (besides and/or behind) to each other via a booking system. Before a boarding sequence for the passengers, the retractable partition walls 3 between the booked seats 1 may be lowered. When the passengers board, they already find a common passenger space 21. Each of the passengers may, if desired, close the retractable partition walls 3 to his/her passenger compartment by pressing a button 20 (see, for example, FIG. 13). Alternatively, in a booking operation, a database indication of specific passenger arrangements/requirements is also possible. For example, if it is already known from data stored in the database that persons travelling at the same time already know each other, these persons may be allocated adjacent passenger compartments and the retractable partition walls 3 may be automatically lowered.

Figure 3:
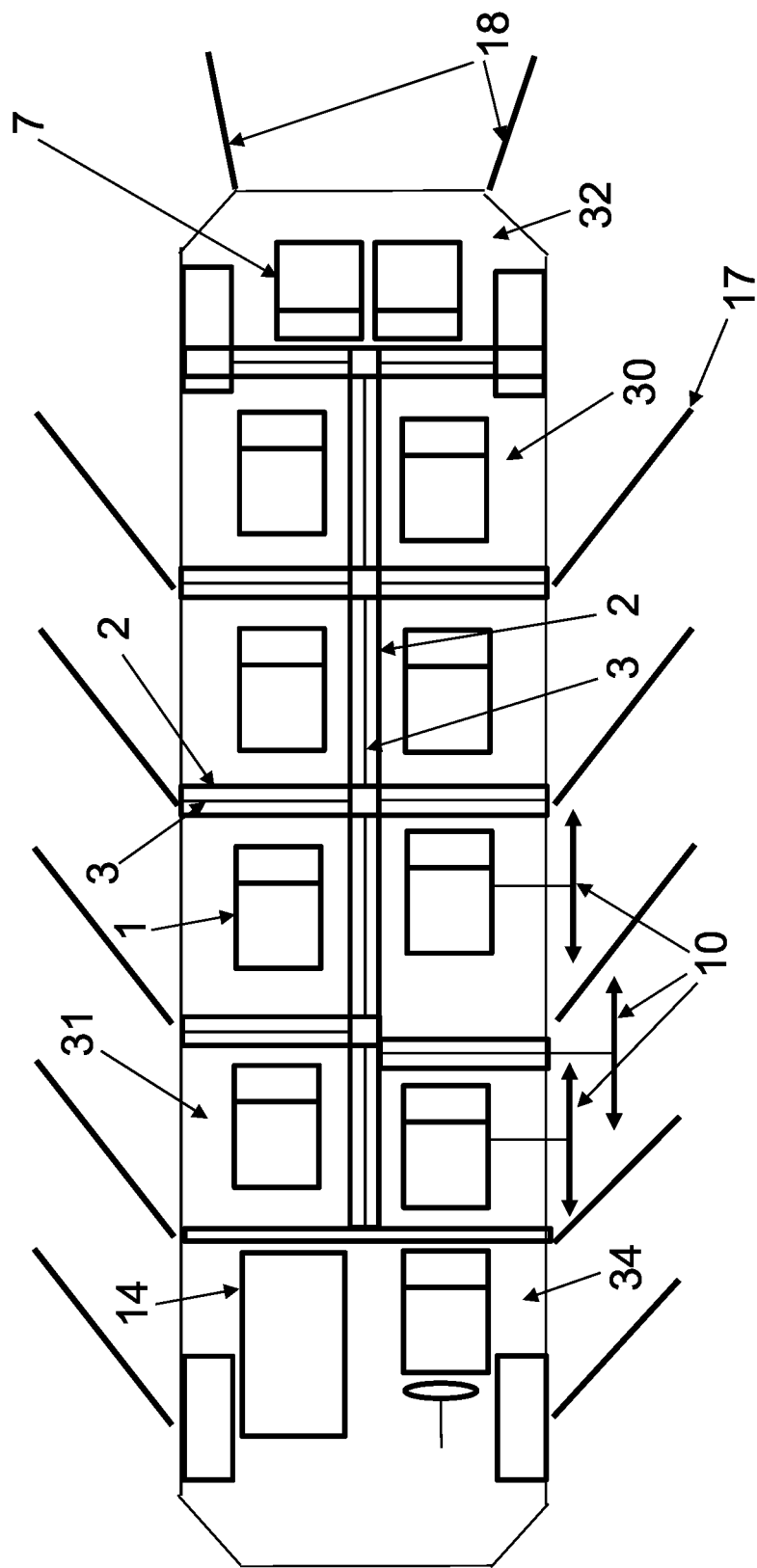

FIG. 3 illustrates another feature which may be implemented in a passenger transport vehicle in accordance with embodiments. The partition walls 2, 3 and seats 1 displaceable in the longitudinal direction by a small distance 10 in order, for example, to increase the comfort for individual passengers. Consequently, the position of some partition walls 2, 3 which are orientated in the transverse direction of the vehicle may be displaceable in the longitudinal direction of the vehicle and the position of at least one or also several partition walls 2, 3 which are orientated in the longitudinal direction of the vehicle may be displaceable in the transverse direction of the vehicle, and the position of seats 1 may similarly be displaceable in the longitudinal and/or transverse direction.

In accordance with embodiments, when booking a seat, one or more passengers may indicate the desired personal comfort, or when they have already boarded may change the free space. The costs of the journey may change with the level of comfort.

Figure 4:
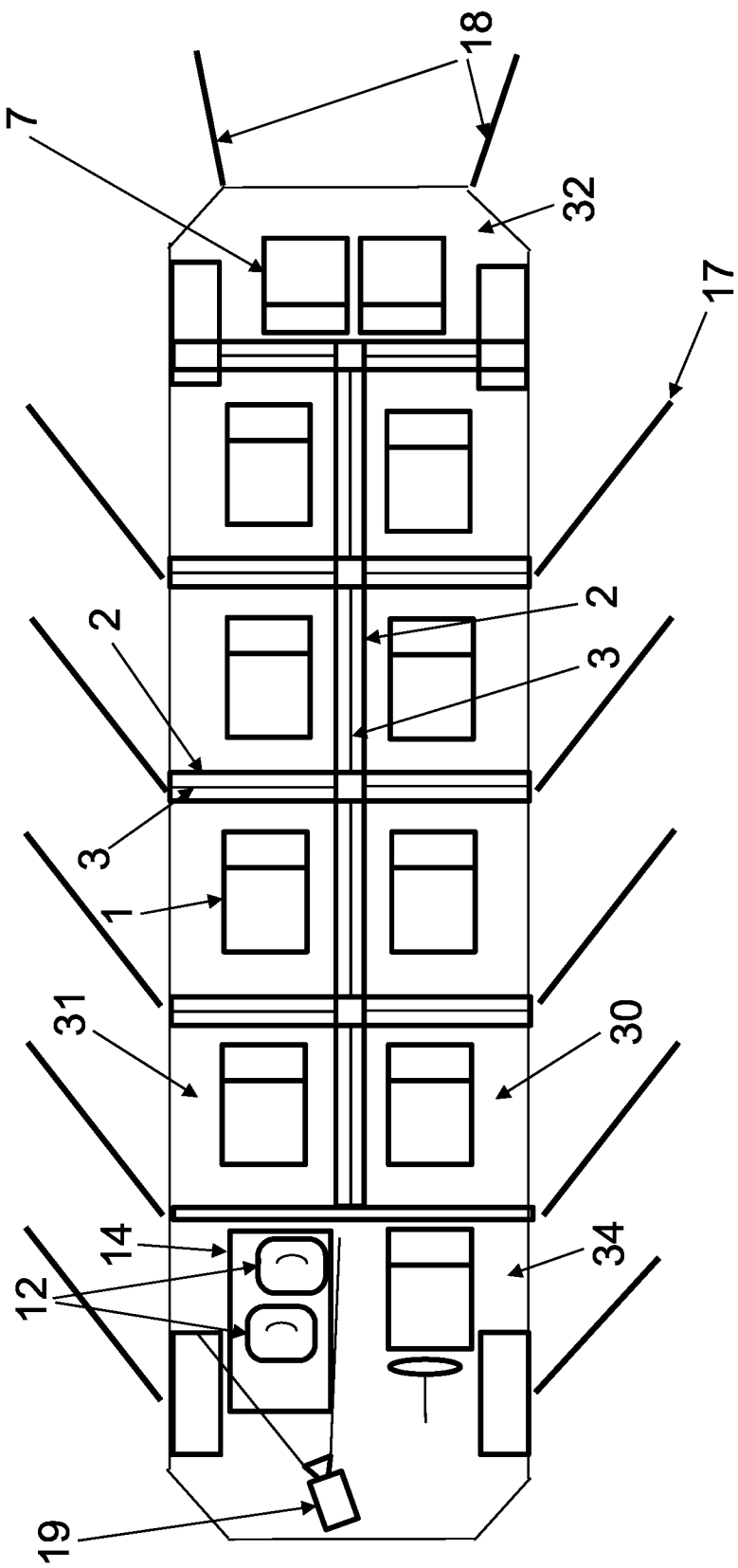

FIG. 4 illustrates a seat arrangement for a driver and ten passengers of a public transport vehicle, such as, for example, a bus. In accordance with embodiments, the public transport vehicle has a surveillance camera 19 in a luggage compartment 14 arranged to receive luggage 12 of one or more passengers. The passenger(s) may place the luggage 12 in the luggage compartment 14 before being seated at a seat 1 in a passenger compartment 30, 31. The passenger may then obtain access to the surveillance camera 19 in the luggage compartment 14. Consequently, the passenger may verify whether his/her luggage 12 has been removed/stolen when items of luggage 12 are removed by other passengers.

Figure 5:
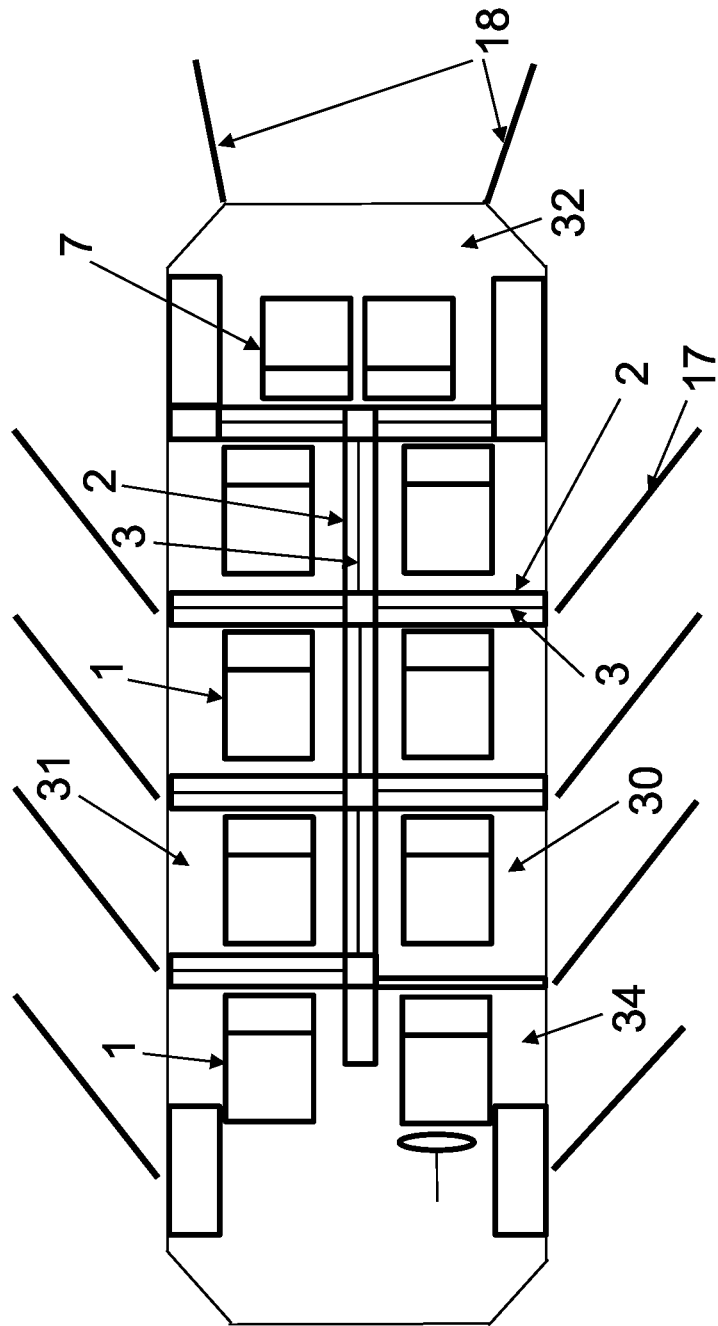

FIG. 5 illustrates a bus which is shorter in length than those illustrated in FIGS. 1 to 4. The bus is configured for nine passengers and a driver. The passenger transport vehicle again has at the rear region a multi-person compartment 32 with a double door 18 and two seats 7 that may be foldable seats. A front end of the passenger transport vehicle has a driver's cab 34 with two access doors 17 in the form of swing doors. A seat 1 for a passenger is also arranged in the driver's cab 34.

Figure 6:
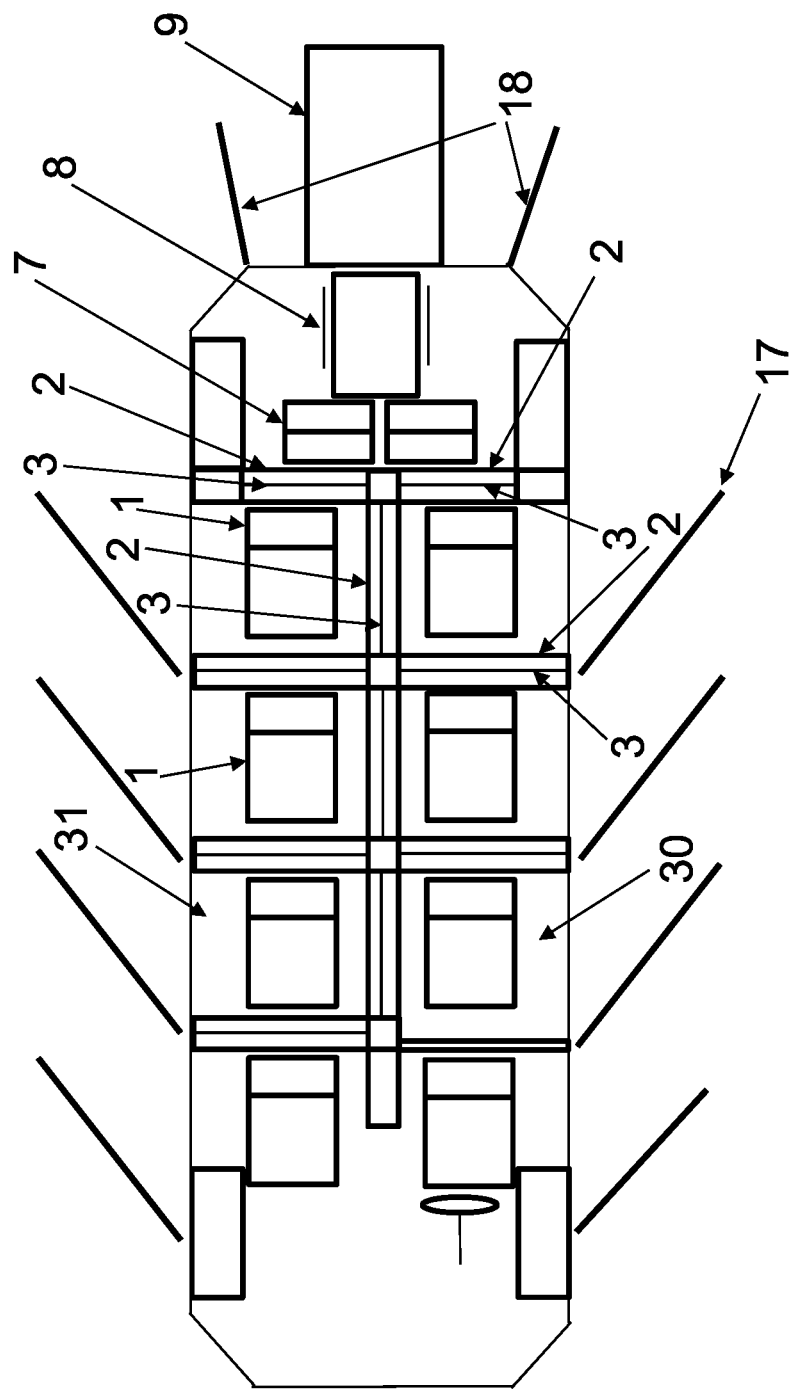

FIG. 6 illustrates a seat arrangement for a passenger transport vehicle that is constructed to have space for a driver and eight passengers, including a wheelchair user. The passenger transport vehicle has a wheelchair space 8 which is produced or released by foldable up the foldable seat 7. Via a wheelchair ramp 9, a wheelchair user may drive into the cab, to the wheelchair space 8. The wheelchair user also has, as a result of the partition wall 2, 3, a separate cab which provides personal privacy. The wheelchair user may interact with the passengers in front by lowering the retractable partition walls 3.

Figure 7:
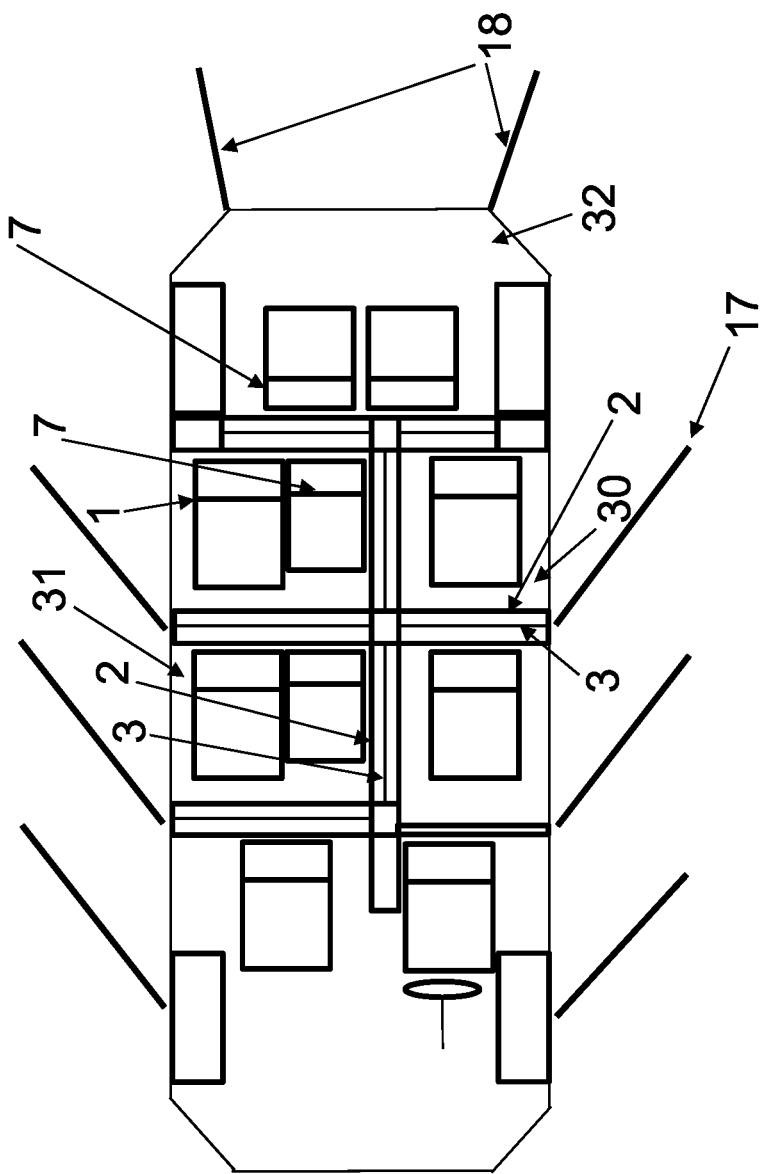

FIG. 7 illustrates a seat arrangement for a passenger transport vehicle that is constructed to have space for a driver and nine passengers. This passenger transport vehicle comprises double cabs each with two seats 1 or foldable seats 7 as right passenger compartments 31. Such double cabs are, for example, suitable for persons travelling in pairs. A double cab again provides the best possible privacy for two passengers in each case as a result of the partition walls 2, 3.

Figure 8:
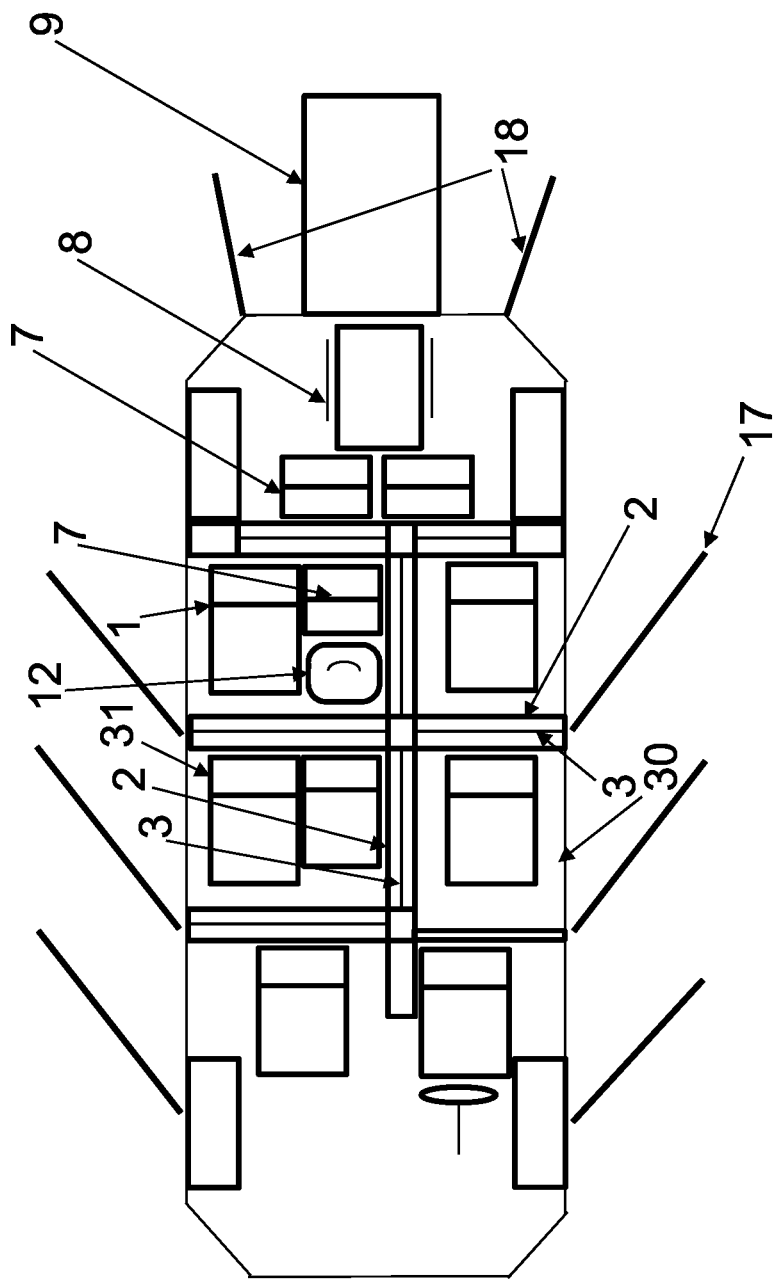

FIG. 8 illustrates a seat arrangement for a passenger transport vehicle that is constructed to have space for a driver and seven passengers, including a wheelchair user, and a large item of luggage 12. The left seat of a double cab is constructed as a foldable seat 7. By folding up the seat 7, space is provided for a large item of luggage 12 of the passenger travelling in this cab. A particular feature is that the passenger at all times has his/her luggage with him/her and may monitor it. Such a double cab or seat with space for luggage may be booked or provided in the following manner. If a passenger travelling with a large item of luggage 12 books a seat, a passenger transport vehicle with the seat arrangement described may be provided therefor. In this instance, a double cab is reserved and automatically two seats 1, 7 are marked as occupied.

Figure 9:
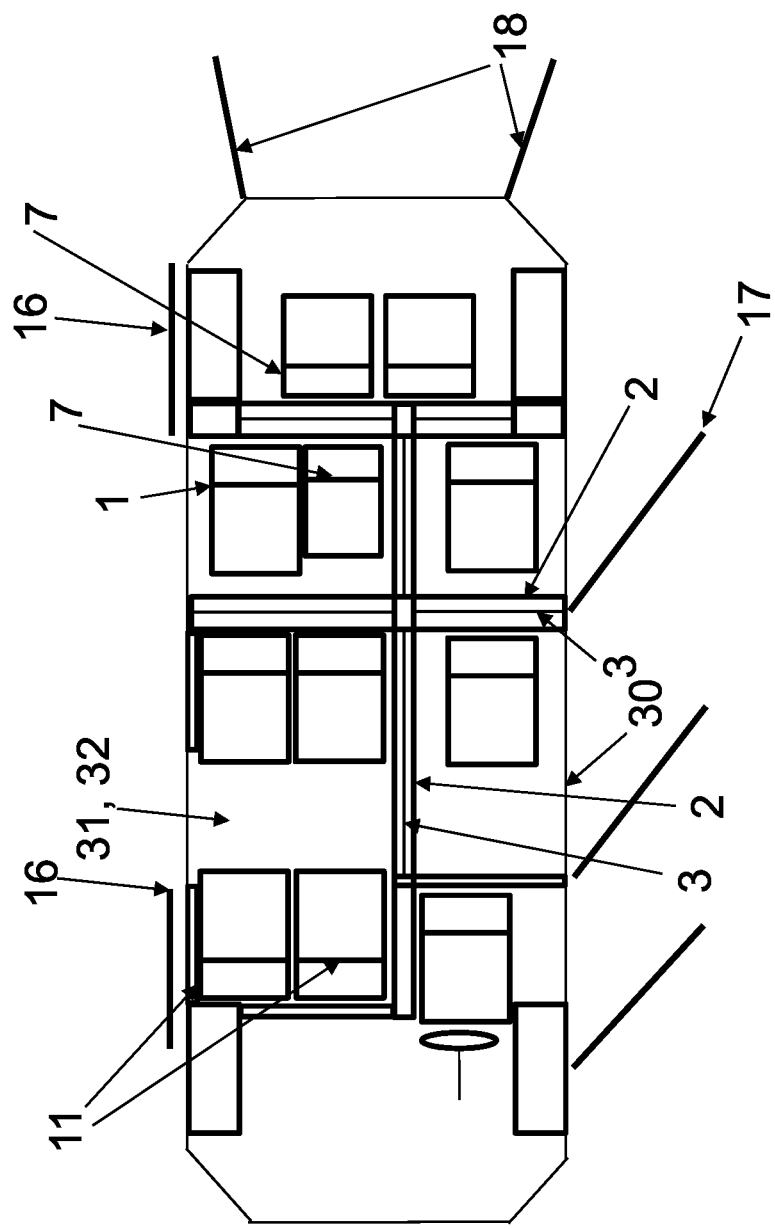

FIG. 9 illustrates a seat arrangement for a passenger transport vehicle that is constructed to have space for a driver and ten passengers. The vehicle has a private cab for four passengers as a multi-person compartment 32 which forms a right passenger compartment 31 and which may be accessed through a sliding door 16. Two of the seats 11 in this cab are arranged counter to the travel direction. For example, persons travelling in groups or with luggage may input this arrangement into booking software and may automatically be allocated a suitable cab, such as this multi-person compartment 32.

Figure 10:
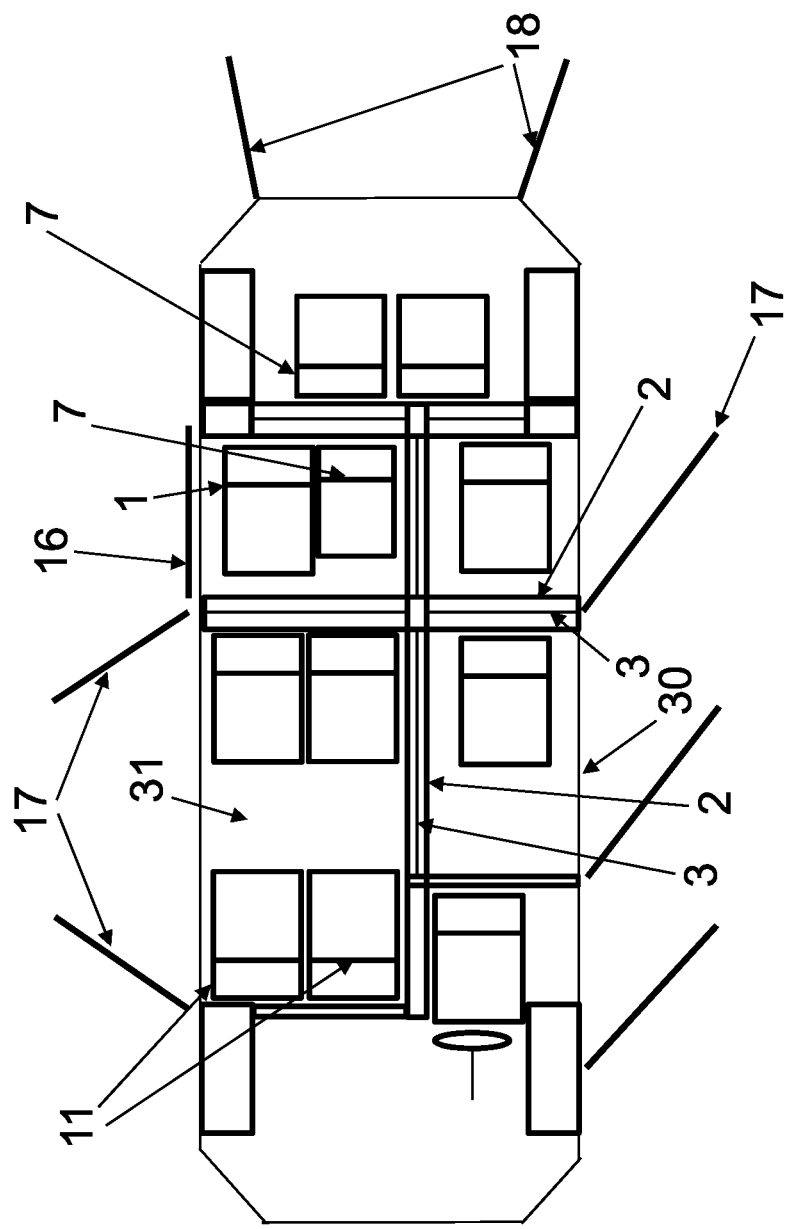

FIG. 10 illustrates a seat arrangement for a passenger transport vehicle that is constructed to have space for a driver and ten passengers, with the cab for four passengers being accessible via two single-action doors 17.

Figure 11:
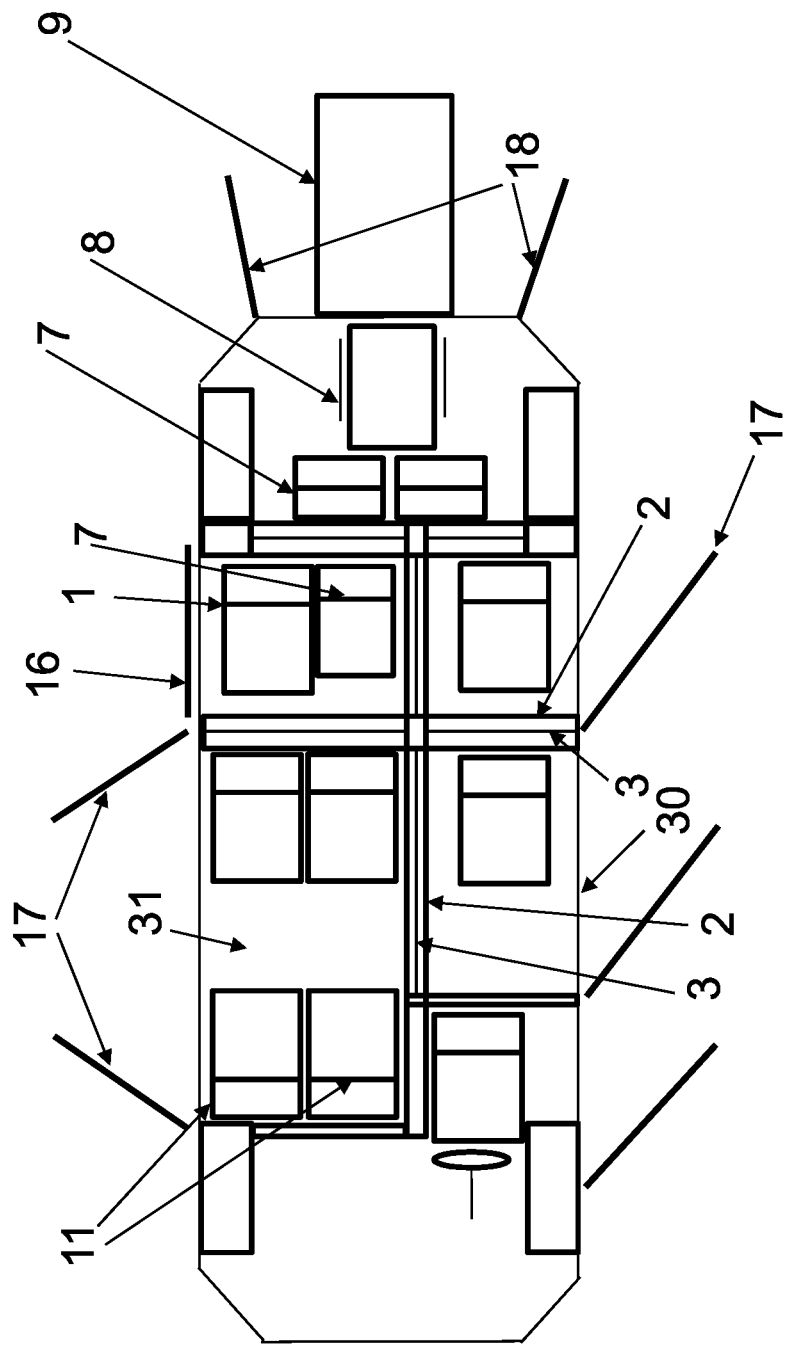

FIG. 11 illustrates a seat arrangement for a passenger transport vehicle that is constructed to have space for a driver and ten passengers, with the cab for four passengers being accessible via two single-action doors 17, and also includes a wheelchair user space 8.

Figure 12:
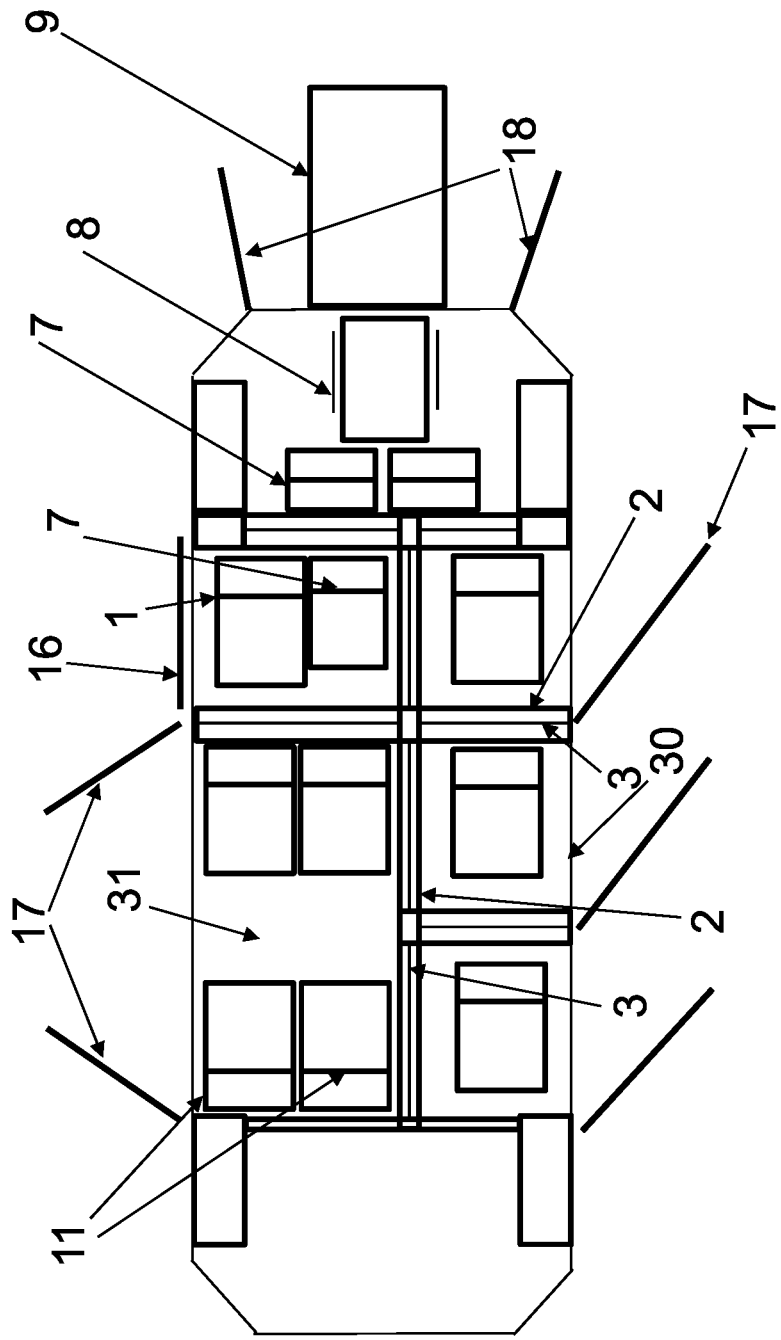

FIG. 12 illustrates a driverless seat arrangement for a passenger transport vehicle that is constructed to have space for ten passengers, with the cab for four passengers being accessible via two single-action doors 17, and also includes a wheelchair user space 8. Accordingly, the passenger transport vehicle is suitable for driverless operation in which the vehicle has only passenger compartments but no driver's cab.

Figure 13:
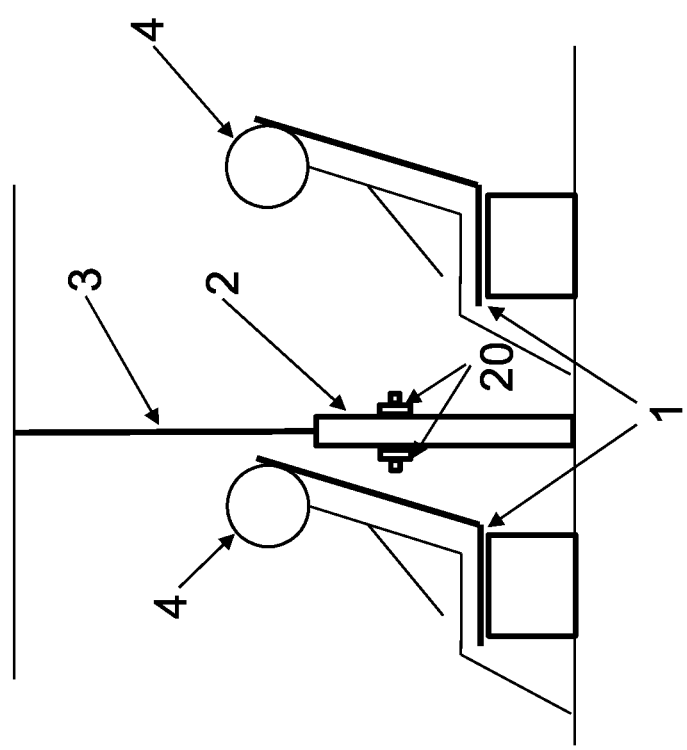

FIG. 13 illustrates an embodiment of the partition walls 2, 3 both for the arrangement in the longitudinal direction of the vehicle and in the transverse direction of the vehicle in a closed state or normal operating state. There is depicted an arrangement having a partition wall 2, 3 between two seats 1 which are arranged one behind the other. The partition wall 2, 3 has a retractable portion 3 and a fixed portion 2. When the partition wall 2, 3 is closed, each passenger 4 has a closed passenger cab or passenger compartment which may be accessed via an external door (see FIGS. 1 to 12). Each passenger 4 thereby has the greatest possible personal privacy.

Figure 14:
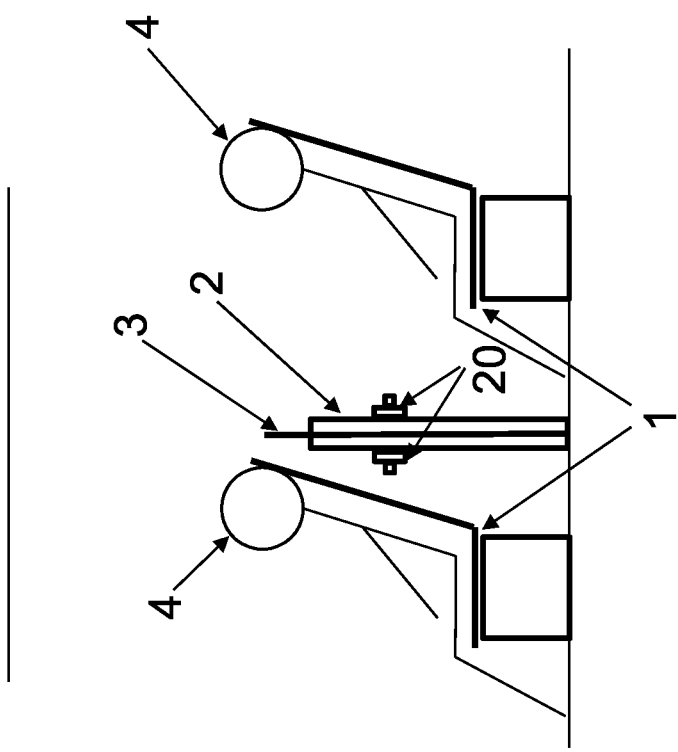

FIG. 14 illustrates the half-open state of the partition wall 2, 3 of FIG. 13. In the illustrated example, by selectively lowering the retractable portion 3 of the partition wall 2, 3 into the fixed portion 2 of the partition wall 2, 3, adjacent passengers 4 may directly interact with each other. Any of the adjacent passengers 4 may selectively close the partition wall 2, 3 at any time by pressing a button 20 to raise the retractable portion 3 of the partition wall. The half-opening of the partition wall 2, 3 may also be enabled via the button 20 by a passenger, wherein a method may be used for this purpose as described in greater detail below in relation to FIG. 22.

Figure 15:
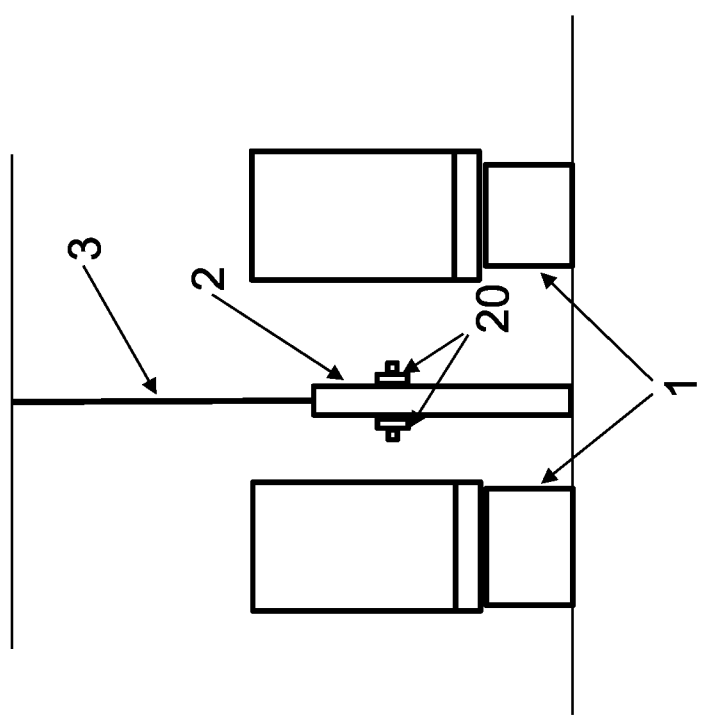

FIG. 15 illustrates an arrangement having a partition wall 2, 3 between two adjacent seats 1, that is to say, a partition wall 2, 3 in the longitudinal direction of the vehicle. The partition wall 2, 3 again has a retractable portion 3. When the partition wall 3 is in a closed operating state, each passenger has a closed passenger cab which may be accessed via an external door.

Figure 16:
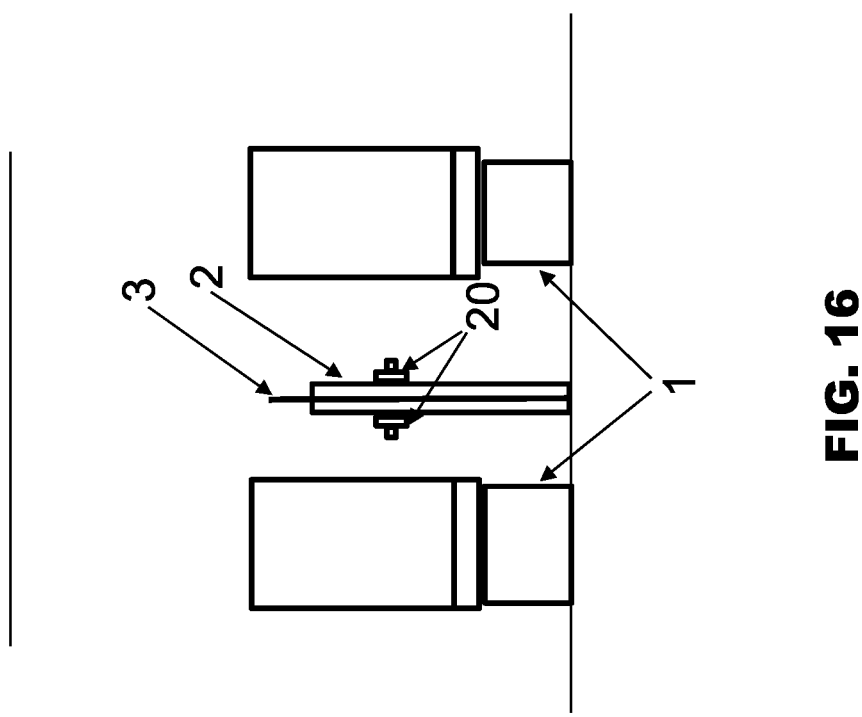

FIG. 16 illustrates the selective lowering of the retractable portion 3 of the partition wall 2, 3 of FIG. 15 so that the passengers may interact directly with each other.

Figure 17:
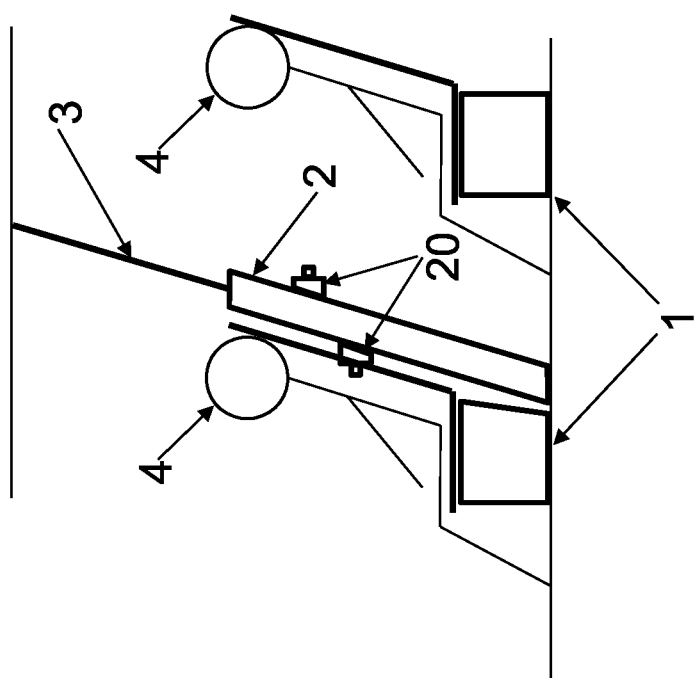

FIG. 17 illustrates another possible variant of the partition wall 2, 3 between two adjacent seats 1 which are arranged one behind the other. In this instance, the partition wall 2, 3 is inclined. Meaning, both the fixed portion 2 and the retractable portion 3 of the partition wall 2, 3 is arranged in an oblique manner in order to provide more foot room for the rear passenger.

Figure 18:
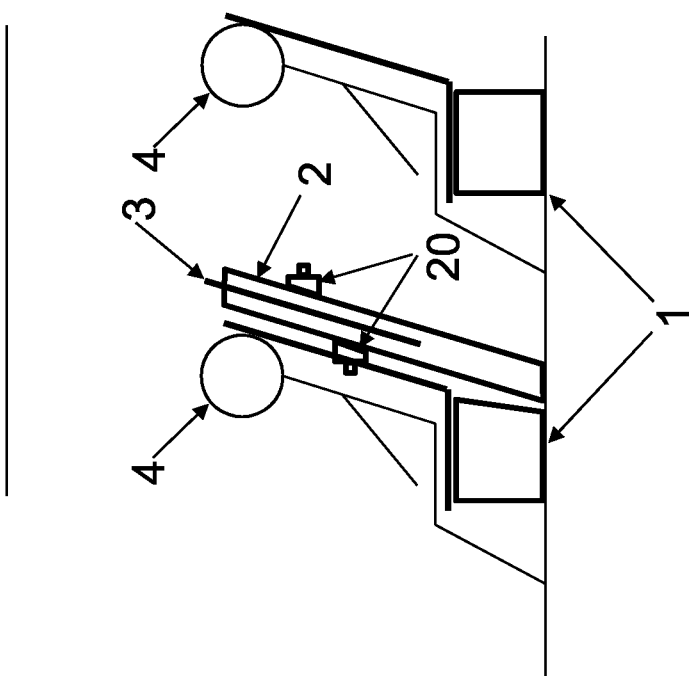

FIG. 18 illustrates the selective lowering of the retractable portion 3 of the partition wall 2, 3 of FIG. 17 in an open or half-open operating state so that the passengers may interact directly with each other.

Figure 19:
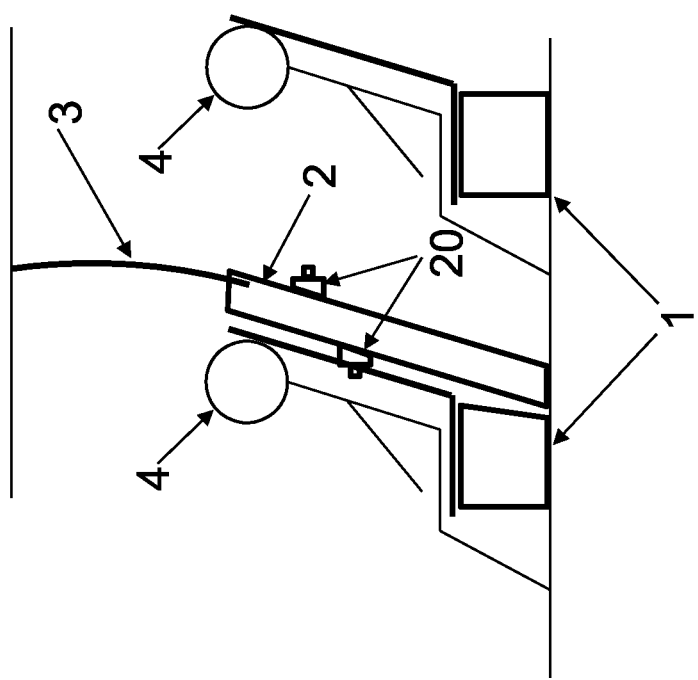

FIG. 19 illustrates another possible variant of the partition wall 2, 3 between adjacent seats 1 which are arranged one behind the other in a closed and half-open position. In this instance, the fixed portion 2 of the partition wall is inclined, that is to say, oblique, in order to provide more foot room for the rear passenger 4. The retractable portion 3 of the partition wall 2, 3 has a curvature so that more free space is obtained when standing in the passenger cab.

Figure 20:
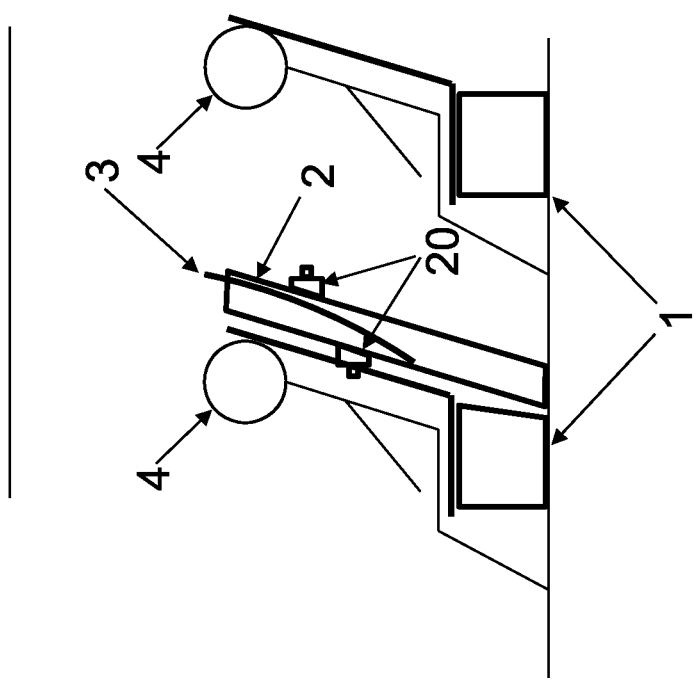

FIG. 20 illustrates the selective lowering of the retractable portion 3 of the partition wall 2, 3 of FIG. 19 in an open or half-open operating state so that the passengers may interact directly with each other.

Figure 21:
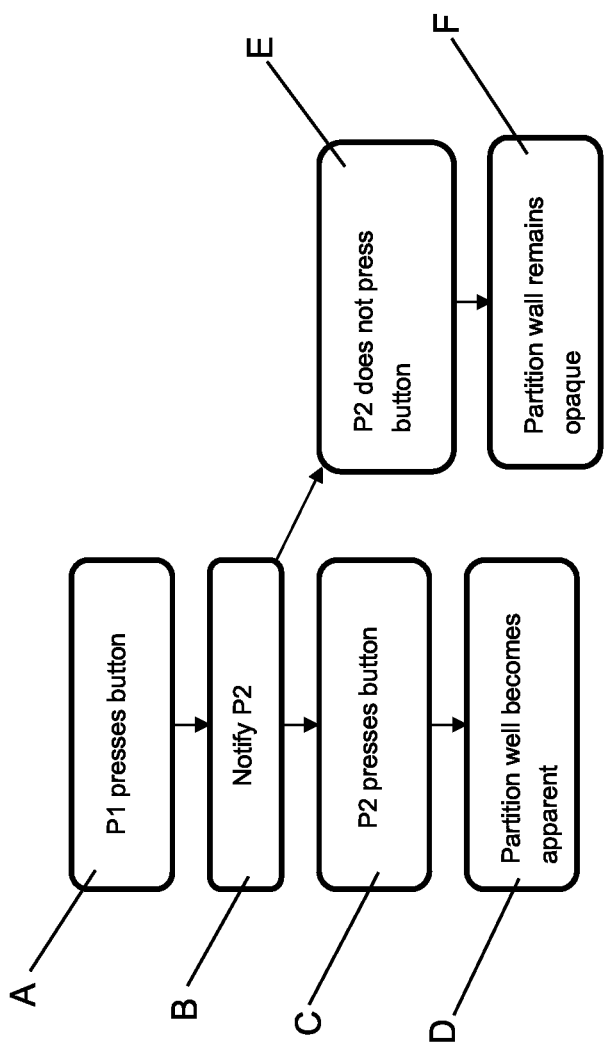
FIG. 21 illustrates a flow chart for placing a partition wall in a transparent operating state, in accordance with embodiments.

FIG. 21 illustrates a method for selectively making the retractable portion 3 of a partition wall 2, 3 transparent. For example, a passenger 4 may selectively press a button 20 to enable the ability to see an adjacent passenger 4 in front. The adjacent passenger 4 may then decide to agree or disagree to making the retractable portion 3 of a partition wall 2, 3 transparent. As a result of a transparent pane, a sense of space is enhanced. A similar method can also be used to open or half-open a partition wall 2, 3, i.e., to raise the retractable portion 3 of the partition wall 2, 3. In accordance with embodiments, the method may be implemented in a control unit.

Illustrated method block A provides for engaging of a button by Passenger 1 (P1) to request changing the partition wall from opaque to transparent.

Illustrated method block B provides for notifying Passenger 2 (P2) the request of Passenger 1 (P1) to make the partition wall transparent.

Illustrated method block C provides for engaging of a button by Passenger 2 (P2) agreeing to make the partition wall transparent.

Illustrated method block D provides for the partition wall becoming transparent.

Illustrated method block E provides for Passenger 2 (P2) not engaging the button to make the partition wall transparent.

Illustrated method block F provides for the partition wall remaining opaque.

Figure 22:
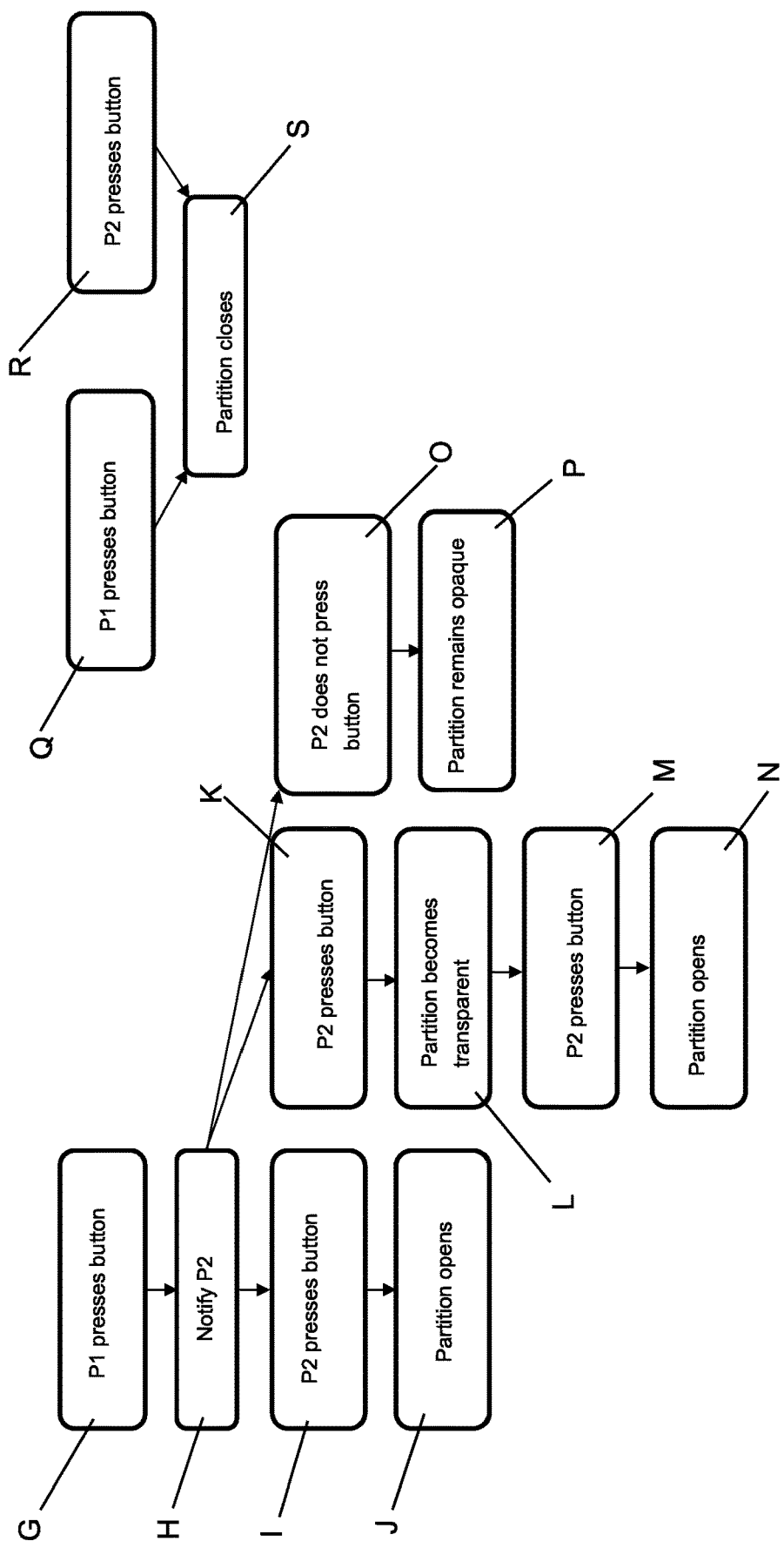
FIG. 22 illustrates a flow chart for opening a partition wall, in accordance with embodiments.

FIG. 22 illustrates a method for selectively lowering and closing the retractable portion 3 of a partition wall 2, 3. If a passenger 4 would like to interact with an adjacent passenger 4, he/she may selectively engage a button 20. The adjacent passenger 4 may then decide to agree or not agree to lowering and/or closing the retractable portion 3 of a partition wall 2, 3. In accordance with embodiments, the method may be implemented in a control unit.

Illustrated method block G provides for Passenger 1 (P1) engaging a button to request opening of the partition wall.

Illustrated method block H provides for notifying Passenger 2 (P2) the request of Passenger 1 (P1) to open the partition wall.

Illustrated method block I provides for engaging of a button by Passenger 2 (P2) agreeing to open the partition wall.

Illustrated method block J provides for opening of the partition wall.

Illustrated method block K provides for Passenger 2 (P2) engaging a button to make the partition wall transparent.

Illustrated method block L provides for the partition wall becoming transparent.

Illustrated method block M provides for Passenger 2 (P2) engaging the button to open the partition wall.

Illustrated method block N provides for the partition wall opening.

Illustrated method block O provides for Passenger 2 (P2) not engaging the button to make the partition wall transparent.

Illustrated method block P provides for the partition wall remaining opaque.

Illustrated method block Q provides for Passenger 1 (P1) engaging a button to request closing of the partition wall.

Illustrated method block R provides for Passenger 2 (P2) engaging the button agreeing to close the partition wall.

Illustrated method block S provides for the partition wall closing.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Seat
2 Partition wall, fixed portion
3 Partition wall, retractable portion
4 Passenger
7 Foldable seat
8 Wheelchair space
9 Wheelchair ramp
10 Displacement path
11 Seat orientated counter to the travel direction
12 Item of luggage
13 Parcel
14 Luggage compartment
16 Sliding door
17 Swing door
18 Double door
19 Surveillance camera
20 Button
21 Common space
30 Left passenger compartment
31 Right passenger compartment
32 Multi-person compartment
33 Wheelchair compartment
34 Driver's cab

What is claimed is:

1. A passenger transport vehicle, comprising:
a passenger transport vehicle body having:
at least one left passenger compartment arranged in a travel direction on a left side of the passenger transport vehicle, and at least one right passenger compartment arranged in a travel direction on a right side of the passenger transport vehicle, each of the at least one left passenger compartment and the at least one right passenger compartment having at least one passenger space with at least one seat and an external access door to permit ingress into and egress from the at least one passenger space, the at least one seat being displaceable in at least one of a longitudinal direction and a transverse direction of the passenger transport vehicle body;
a first partition wall arranged between the at least one left passenger compartment and the at least one right passenger compartment, and which extends in a longitudinal direction of the passenger transport vehicle to restrict entry of passengers between the left passenger compartment and the right passenger compartment; and
a second partition wall arranged between adjacent left passenger compartments, the second partition wall extending in a transverse direction of the passenger transport vehicle, restricts entry of passengers between different left passenger compartments, wherein the second partition wall is displaceable in the longitudinal direction of the passenger transport vehicle body.

2. The passenger transport vehicle of claim 1, wherein the passenger transport vehicle has no central aisle for longitudinal ingress and egress through the vehicle.

3. The passenger transport vehicle of claim 1, wherein each passenger compartment comprises two seats.

4. The passenger transport vehicle of claim 1, wherein the second partition wall comprises a fixed partition wall portion and a retractable partition wall portion.

5. The passenger transport vehicle of claim 4, wherein the retractable partition wall portion is retractable into the fixed partition wall portion.

6. The passenger transport vehicle of claim 4, wherein the retractable partition wall portion is selectively moveable by a passenger at least partially into a half-open position.

7. The passenger transport vehicle of claim 1, wherein at least one of the first partition wall and the second partition wall is selectively switchable between an opaque operating state, a partial transparent operating state, and a fully transparent operating state.

8. The passenger transport vehicle of claim 1, wherein the first partition wall is displaceable in the transverse direction of the vehicle.

9. The passenger transport vehicle of claim 1, wherein the first partition wall comprises a fixed partition wall portion and a retractable partition wall portion.

10. The passenger transport vehicle of claim 9, wherein the retractable partition wall portion is retractable into the fixed partition wall portion.

11. The passenger transport vehicle of claim 9, wherein the retractable partition wall portion is selectively moveable by a passenger at least partially into a half-open position.

12. A passenger transport vehicle, comprising:
a passenger transport vehicle body having:
a plurality of first passenger compartments arranged in a longitudinal direction on a left side of the passenger transport vehicle, and a plurality of second passenger compartments arranged in a longitudinal direction on a right side of the passenger transport vehicle, each first passenger compartment and second passenger compartment respectively having at least one first passenger space with at least one seat and an external access door to permit ingress into and egress from the at least one passenger space, the at least one seat being displaceable in at least one of a longitudinal direction and a transverse direction of the passenger transport vehicle body;

a partition wall arranged between the first passenger compartments and the second passenger compartments, and which extends in a longitudinal direction of the passenger transport vehicle to restrict entry of passengers between the first passenger compartments and the second passenger compartments, wherein the partition wall is displaceable in the transverse direction of the passenger transport vehicle body; and a third passenger compartment having at least one second passenger space and a third access door to permit ingress into and egress from the at least one second passenger space.

13. The passenger transport vehicle of claim 12, wherein the third passenger compartment comprises a luggage compartment.

14. The passenger transport vehicle of claim 12, wherein the third passenger compartment comprises a wheelchair user compartment.

15. The passenger transport vehicle of claim 12, wherein the third passenger compartment comprises a driver's cab.

16. A passenger transport vehicle, comprising:
a passenger transport vehicle body having:
a plurality of first passenger compartments arranged in a longitudinal direction on a left side of the passenger transport vehicle, and a plurality of second passenger compartments arranged in a longitudinal direction on a right side of the passenger transport vehicle, each first passenger compartment and second passenger compartment respectively having at least one passenger space with at least one seat and an external access door to permit ingress into and egress from the at least one passenger space, the at least one seat being displaceable in at least one of a longitudinal direction and a transverse direction of the passenger transport vehicle body;

a first partition wall arranged between the first passenger compartments and the second passenger compartments, and which extends in a longitudinal direction of the vehicle to restrict entry of passengers between the first passenger compartments and the second passenger compartments; and a plurality of second partition walls which extend in a transverse direction of the passenger transport vehicle to restrict entry between passengers in the first passenger compartments and also restrict entry between passengers in the second passenger compartments, the second partition walls being displaceable in the longitudinal direction of the passenger transport vehicle body.

* * * * *